United States Patent
Horvitz et al.

(10) Patent No.: US 7,912,637 B2
(45) Date of Patent: Mar. 22, 2011

(54) LANDMARK-BASED ROUTING

(75) Inventors: Eric J. Horvitz, Kirkland, WA (US);
Tanya Lisa Swartz, New York, NY
(US); Jeffrey D. Couckuyt, Bothell, WA
(US); Eyal Ofek, Redmond, WA (US);
Yue Zhuge, Bejing (CN); Zhenyu Qian,
Cupertino, CA (US); Xin Wu, Beijing
(CN); Jin Li, Sammamish, WA (US);
Steve Lombardi, Seattle, WA (US);
Joseph Schwartz, Redmond, WA (US);
Alan Paulin, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 97 days.

(21) Appl. No.: 11/767,921

(22) Filed: Jun. 25, 2007

(65) Prior Publication Data

US 2008/0319659 A1    Dec. 25, 2008

(51) Int. Cl.
*G01C 21/30* (2006.01)
(52) U.S. Cl. .................. 701/211; 701/208; 701/209
(58) Field of Classification Search .................. 701/200, 701/207, 208, 209, 211
See application file for complete search history.

(56) References Cited

U.S. PATENT DOCUMENTS

| | | | |
|---|---|---|---|
| 4,570,227 A | 2/1986 | Tachi et al. | |
| 5,179,519 A | 1/1993 | Adachi et al. | |
| 5,220,507 A | 6/1993 | Kirson | |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,608,635 A | 3/1997 | Tamai | |
| 5,611,050 A | 3/1997 | Theimer et al. | |
| 5,812,865 A | 9/1998 | Theimer et al. | |
| 5,835,881 A | 11/1998 | Trovato et al. | |
| 5,911,773 A | 6/1999 | Mutsuga et al. | |
| 6,078,865 A * | 6/2000 | Koyanagi | 701/211 |
| 6,119,065 A | 9/2000 | Shimada et al. | |
| 6,154,658 A * | 11/2000 | Caci | 455/466 |
| 6,298,304 B1 | 10/2001 | Theimer | |

(Continued)

FOREIGN PATENT DOCUMENTS

KR    10-2006-0036259 A    4/2006

(Continued)

OTHER PUBLICATIONS

Habel. "Incremental Generation of Multimodal Route Instructions," http://www.cs.niu.edu/~nlgdial/final/SS703CHabel.pdf, last access Dec. 11, 2006, 8 pages, Hamburg, Germany.

(Continued)

*Primary Examiner* — Mark Hellner
*Assistant Examiner* — Helal A Algahaim
(74) *Attorney, Agent, or Firm* — Wolf, Greenfield & Sacks, P.C.

(57) ABSTRACT

Driving directions can be helpful if in addition to spatial information, landmark information is provided. Landmarks assist in adding context to directions as well as allowing for a greater likelihood of success of an operator following directions. There can be employment of physical identification of landmarks as well as processing regarding the utility of a landmark in regards to driving directions. Driving directions can be highly useful if integrated landmarks relate to knowledge possessed by an operator of a vehicle. Landmark based driving direction can be integrated with advertisements that relate to the directions.

20 Claims, 13 Drawing Sheets

U.S. PATENT DOCUMENTS

| | | | |
|---|---|---|---|
| 6,339,746 B1* | 1/2002 | Sugiyama et al. | 701/209 |
| 6,353,398 B1 | 3/2002 | Amin et al. | |
| 6,466,232 B1 | 10/2002 | Newell et al. | |
| 6,477,460 B2* | 11/2002 | Kepler | 701/209 |
| 6,513,046 B1 | 1/2003 | Abbott, III et al. | |
| 6,526,350 B2* | 2/2003 | Sekiyama | 701/209 |
| 6,549,915 B2 | 4/2003 | Abbott, III et al. | |
| 6,622,089 B2* | 9/2003 | Hasegawa et al. | 701/211 |
| 6,672,506 B2 | 1/2004 | Swartz et al. | |
| 6,694,252 B2 | 2/2004 | Ukita | |
| 6,728,635 B2* | 4/2004 | Hamada et al. | 701/211 |
| 6,741,188 B1 | 5/2004 | Miller et al. | |
| 6,747,675 B1 | 6/2004 | Abbott et al. | |
| 6,748,225 B1 | 6/2004 | Kepler | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,837,436 B2 | 1/2005 | Swartz et al. | |
| 6,842,877 B2 | 1/2005 | Robarts et al. | |
| 6,898,518 B2 | 5/2005 | Padmanabhan | |
| 6,952,647 B2* | 10/2005 | Hasegawa et al. | 701/209 |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,103,473 B2 | 9/2006 | Ranjan | |
| 7,171,378 B2 | 1/2007 | Petrovich et al. | |
| 7,195,157 B2 | 3/2007 | Swartz et al. | |
| 7,385,501 B2 | 6/2008 | Miller et al. | |
| 7,512,487 B1 | 3/2009 | Golding et al. | |
| 2001/0007968 A1 | 7/2001 | Shimazu | |
| 2001/0025223 A1 | 9/2001 | Geiger et al. | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0072848 A1* | 6/2002 | Hamada et al. | 701/211 |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0164998 A1 | 11/2002 | Younis | |
| 2002/0173905 A1* | 11/2002 | Jin et al. | 701/207 |
| 2003/0046401 A1 | 3/2003 | Abbott et al. | |
| 2003/0154476 A1 | 8/2003 | Abbott, III et al. | |
| 2003/0182052 A1 | 9/2003 | DeLorme et al. | |
| 2003/0220725 A1* | 11/2003 | Harter et al. | 701/36 |
| 2004/0201500 A1 | 10/2004 | Miller et al. | |
| 2004/0220726 A1* | 11/2004 | Jin et al. | 701/207 |
| 2005/0034078 A1 | 2/2005 | Abbott et al. | |
| 2005/0182564 A1* | 8/2005 | Kim | 701/211 |
| 2005/0266858 A1 | 12/2005 | Miller et al. | |
| 2005/0272442 A1 | 12/2005 | Miller et al. | |
| 2005/0288859 A1 | 12/2005 | Golding et al. | |
| 2006/0019676 A1 | 1/2006 | Miller et al. | |
| 2006/0031062 A1 | 2/2006 | Bakis et al. | |
| 2006/0212220 A1 | 9/2006 | Bou-Ghannam et al. | |
| 2006/0271277 A1 | 11/2006 | Hu et al. | |
| 2007/0010754 A1* | 1/2007 | Muller et al. | 600/544 |
| 2007/0016368 A1 | 1/2007 | Chapin et al. | |
| 2007/0032942 A1* | 2/2007 | Thota | 701/200 |
| 2007/0073472 A1 | 3/2007 | Odinak et al. | |
| 2007/0078596 A1* | 4/2007 | Grace | 701/209 |
| 2007/0083428 A1 | 4/2007 | Goldstein | |
| 2007/0118278 A1* | 5/2007 | Finn et al. | 701/208 |
| 2007/0156333 A1* | 7/2007 | McBride et al. | 701/209 |
| 2007/0160291 A1* | 7/2007 | Takahashi | 382/181 |
| 2007/0233371 A1 | 10/2007 | Stoschek et al. | |
| 2007/0260393 A1* | 11/2007 | Abernethy et al. | 701/201 |
| 2007/0299607 A1* | 12/2007 | Cubillo | 701/211 |
| 2008/0010006 A1 | 1/2008 | Schwarzmann | |
| 2008/0027635 A1 | 1/2008 | Tengler et al. | |
| 2008/0033644 A1 | 2/2008 | Bannon | |
| 2008/0051994 A1 | 2/2008 | Fisher et al. | |
| 2008/0090591 A1 | 4/2008 | Miller et al. | |
| 2008/0091537 A1 | 4/2008 | Miller et al. | |
| 2008/0140310 A1 | 6/2008 | Graef | |
| 2008/0161018 A1 | 7/2008 | Miller et al. | |
| 2008/0262717 A1 | 10/2008 | Ettinger | |
| 2008/0291205 A1 | 11/2008 | Rasmussen et al. | |
| 2008/0319658 A1 | 12/2008 | Horvitz et al. | |
| 2008/0319659 A1 | 12/2008 | Horvitz et al. | |
| 2009/0192705 A1 | 7/2009 | Golding et al. | |

FOREIGN PATENT DOCUMENTS

| | | |
|---|---|---|
| KR | 10-2007-0064052 A | 6/2007 |
| WO | 9800787 | 1/1998 |
| WO | 2004-081496 A1 | 9/2004 |

OTHER PUBLICATIONS

Eugenio, et al. "Generating driving directions for intelligent vehicles interfaces," 12th IEEE International Conference and Workshops on the Engineering of Computer-Based Systems, 2005, 8 pages.

"MapmyIndia rocks Indian Web2.0 with GoogleMap Type Digitised Mapping," http://www.webyantra.net/tag/mashup/, last accessed Mar. 16, 2007, 7 pages.

Koleszar. "A Landmark-Based Location Reference Grid for Street Maps," http://stinet.dtic.mil/oai/oai?&verb=getRecord&metadataPrefix=html&identifier=ADA070048, Defense Technical Information Center, Jun. 1, 1979, 1 pages.

"PDA Toshiba," http://www.citynotebookcentre.com.au/Products/PDA&CELL/Toshiba/toshiba_pda_e740.htm, last accessed Mar. 16, 2007, 3 pages.

Hampe et al. "Integrating topographic information and landmarks for mobile navigation," http://www.ikg.uni-hannover.de/publikationen/2003/wien_hampe_elias.pdf, last accessed Mar. 14, 2007, 13 pages.

May et al. "Presence and Quality of Navigational Landmarks: Effect on Driver Performance and Implications for Design," http://magpie.lboro.ac.uk/dspace/bitstream/2134/2277/1/PUB284.pdf, last accessed Mar. 14, 2007, 40 pages, Loughborough, United Kingdom.

Assessing Spatial Distribution of Web Resources for Navigation Services http://www.sli.unimelb.edu.au/tomko/publications/tomko04case.pdf.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

International Search Report and Written Opinion for PCT Application Serial No. 2008/067800, dated Dec. 23, 2008, 10 pages.

\* cited by examiner

US 7,912,637 B2

LANDMARK-BASED ROUTING

TECHNICAL FIELD

The subject specification relates generally to route generation and in particular to augmenting computer-based routes with identification landmarks.

BACKGROUND

When parties travel to a new location, they can employ directions to assist in finding a route. Common directional schemes provide turn-by-turn steps an operator can employ to reach a destination. The steps can include official highway information (e.g., take Fifth Avenue, State Highway 631.) as well as distance information (e.g., you will be on Fifth Avenue for 23.2 miles.)

Various computer programs are available to assist an operator in producing directions. Conventional visual direction generation programs provide both text directions (e.g., turn left on Main Street) as well as a map highlighting a suggested route to be used by the operator. A problem with visual direction types is that it forces the operator to take her eyes off the road. Shifting attention away from vehicle operation can lead to an increase probability of accidents as well as the possibility of missing critical information (e.g., a street sign.)

To eliminate some of the problems associated with visual directions, various other alternatives have been developed. One of the more popular alternatives is direction systems integrated with audio instructions. In addition to having a visual display, a digital voice sends audio instructions to a user. This allows users to focus visual resources on operating the vehicle.

When taking a route, users commonly can notice landmarks along the route. For example, if an operator is running low on fuel, the operator likely will take note of the location of a re-fuel station. Some landmarks are more distinctive and have a greater change of being remembered. For example, some cities can have iconic structures located throughout a city that service as landmarks (e.g., painted cows, painted guitars, etc.) These landmarks are commonly memorable to a user that a user associates with a location.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

Conventional automated route generation systems do not provide landmark information in addition to turn-by-turn directions. The subject specification discloses information related to integrating landmark information. When a person provides directions, there is commonly presentment of landmark information (e.g., you will make a right onto Main Street, right after the large oak tree.) A modification component takes a generated route and augments the route with relevant landmark information. A landmark-integrated route is transferred to an operator via a transmission component.

One manner to improve route presentation is through enabling an operator to follow directions that relate to familiar landmarks. If the operator is familiar with some landmarks, then the operator should have a lesser likelihood of becoming lost if a route has at least some familiar landmarks. For example, if a user is going to a suburb she has never visited near a downtown area she has visited, then the directions can take her to the downtown area and lead her to the suburb. Limited instruction can be provided to take the user to the downtown area since the user is already familiar with the area. This provides benefit to both the user and the vehicle; the user is not given unnecessary information and the vehicle can devote resources to other applications since fewer directions are provided.

Another manner to improve route presentation is to include directed advertising in a landmark route. Advertisements can provide a stream of revenue as well as give a user and familiar understanding of an area. Various embodiments exist to improve routes presented on a website, in a desktop application, in a mobile device, in a vehicle, etc. One embodiment includes using an algorithm to score different landmarks, where artificial intelligence determines which landmarks to integrate into the route based on the score. In another embodiment, storage retains information that relates to a user's previous uses of a website, application, mobile device, vehicle, etc.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
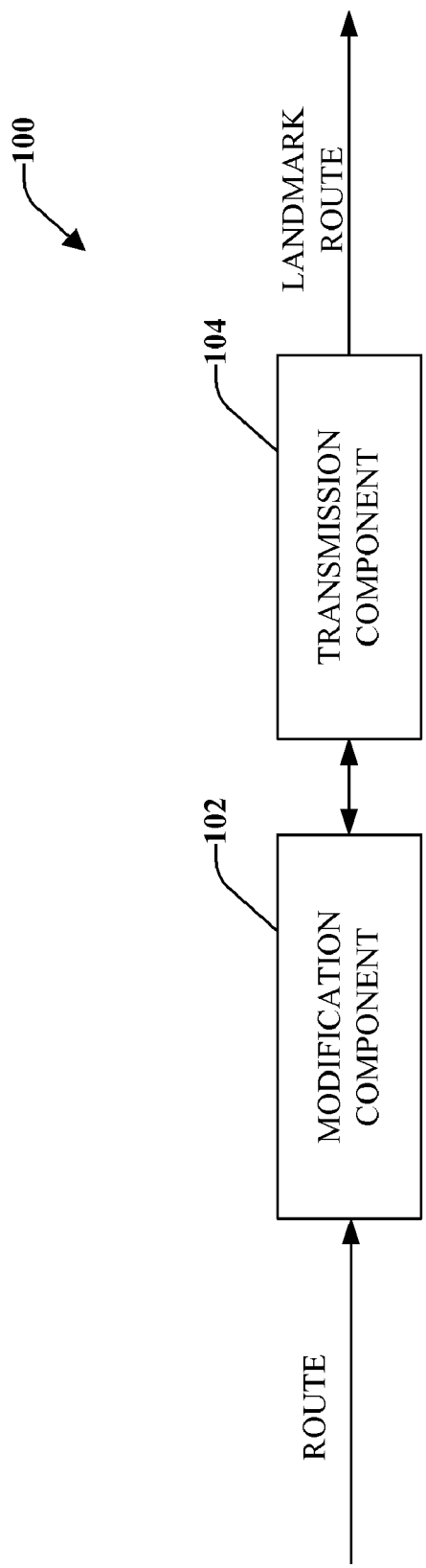
FIG. 1 illustrates a representative route modification system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or Application Programming Interface (API) components. As used in this application, the terms "route", "path", "direction", "directions", or the like are generally intended to refer to at least one directional instruction. A route can include at least one direction that a user can follow. A route can be presented in whole (e.g., all directions provided at once) or in part (e.g., after one direction is completed, another direction is followed.)

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Commonly, when one individual communicates directions to a driver the directions include both street information (e.g., turn right on Main Street) as well as supplemental information. Supplemental information typically can include topology (e.g., make a right at the top of the hill), geographical (e.g., you will see the Cuyahoga River on your left), dynamic data (e.g., during the day the building has an active multi-level fountain), large objects (e.g., the Terminal Tower will be visible in front of you), etc. However, while this information is useful in providing directions, there is no computer application that takes landmarks into account.

Conventional computer-generated driving directions today are very robotic, and do not do an adequate job of mimicking driving directions provided by one person to another. When a person gives directions, they realize that landmarks are just as important, if not more important, as road names. As a result it is typical for a person to pepper their directions with highly visible roadside landmarks such as "Go down Main street for about 3 blocks. When you see a gas station on your left, make a right onto James Street. Go about a mile until you see a hamburger restaurant, then make a right on 23rd street. Go a few blocks and make a left on Elm. If you see a pharmacy, you went too far."

Conventional computer-generated driving directions are difficult to use in many situations. A user could know he needs to make a left on South Moorland Road, but it is dark or foggy making street signs difficult to see, forcing him to slow down and study each intersection. Tree branches may be obstructing street signs, or a sign may be missing entirely. However, a gas station on the corner, just before South Moorland is well lit and visible. If directions told him to make a left on Moorland, just past the gas station, the directions would be much more useable.

FIG. 1 discloses an example route planning system 100. A route enters into a modification component 102. The modification component 102 augments a route with additional landmark information (e.g., topological information.) For example, there can be a route that instructs a driver to 'turn right on Main Street.' The modification component 102 can change an instruction to 'turn right at the Smith Drug Store on Main Street' (emphasis added.) The modification component 102 can operate as a means for augmenting directions with identified landmark information.

A modified route transfers to a transmission component 104. The transmission component 104 sends the route to an auxiliary location. An auxiliary location can include a display screen, a printer, a speaker, etc. Transmission can take place wirelessly (e.g., communication of the modified route to a satellite) or through a wired configuration (e.g., through wires to a display screen in a vehicle.) The modification component 102 integrates landmark information upon a route. The transmission component emits an integrated route to an auxiliary location.

It is to be appreciated that the modification component 102 can integrate with a route generation component. For example, there can be augmentation of the route during route creation. Creation and modification can occur concurrently through utilization of the system 100.

The following is an example of two different direction sets: one direction set with topology information and one direction set without topology information:

| Start: | One Microsoft Way Redmond, WA 98052 | End: | 8122 120th Place SE Newcastle, WA 98056 |
|---|---|---|---|

Directions without Topology
    Turn Left (North) onto 159th Ave NE, then immediately turn Left (West) onto NE 40th St
        Take Ramp (Left) onto SR-520 towards k\WA-520
        Take Ramp (Right) onto 1-405 towards 1-405/Renton
        At exit 9, turn Right onto Ramp towards 112th Ave. S. E.
        Turn Left (east) onto Lake Washington Blvd SE
        Turn Left (east) onto SE 60th St
        Turn Right (South) onto 116th Ave SE
        Turn Left (East) onto SE 80th St
        Turn Right (South) onto 119th Ave SE
        Turn Left (North-East) onto 120th Pl SE
Driving Directions with Topology
    Turn Left (North) onto 159th Ave NE, then immediately turn Left (West) onto NE 40th St
        Take Ramp (Left) onto SR-520 towards WA-520
        Take Ramp (Right) onto 1-405 towards 1-405/Renton
        At exit 7, turn Right onto Ramp towards 44th Ave. S. E.
        Turn Left at Stop sign, go over overpass
        Take first Left onto Lake Washington Blvd. SE
        Take first Right (after Denny's) onto SE 76th Street
        Go up a steep hill
        At the stop sign at the top of the hill, turn Right onto 116th Ave SE
        Take second Right onto SE 80th St
        Take second Right onto 119th Ave SE
        Take first Left onto 120th Pl SE
    New classes of perceived landmarks can include topological features (e.g., road contours, curves, hills, poorly lit drives, rough drives, street sizes, etc.), natural landmarks (e.g., water features, mountains, fields, etc.), fabricated structures and artifacts (e.g., towers, distinctive buildings, dams, statues, artwork, etc.) and the like.

Figure 2:
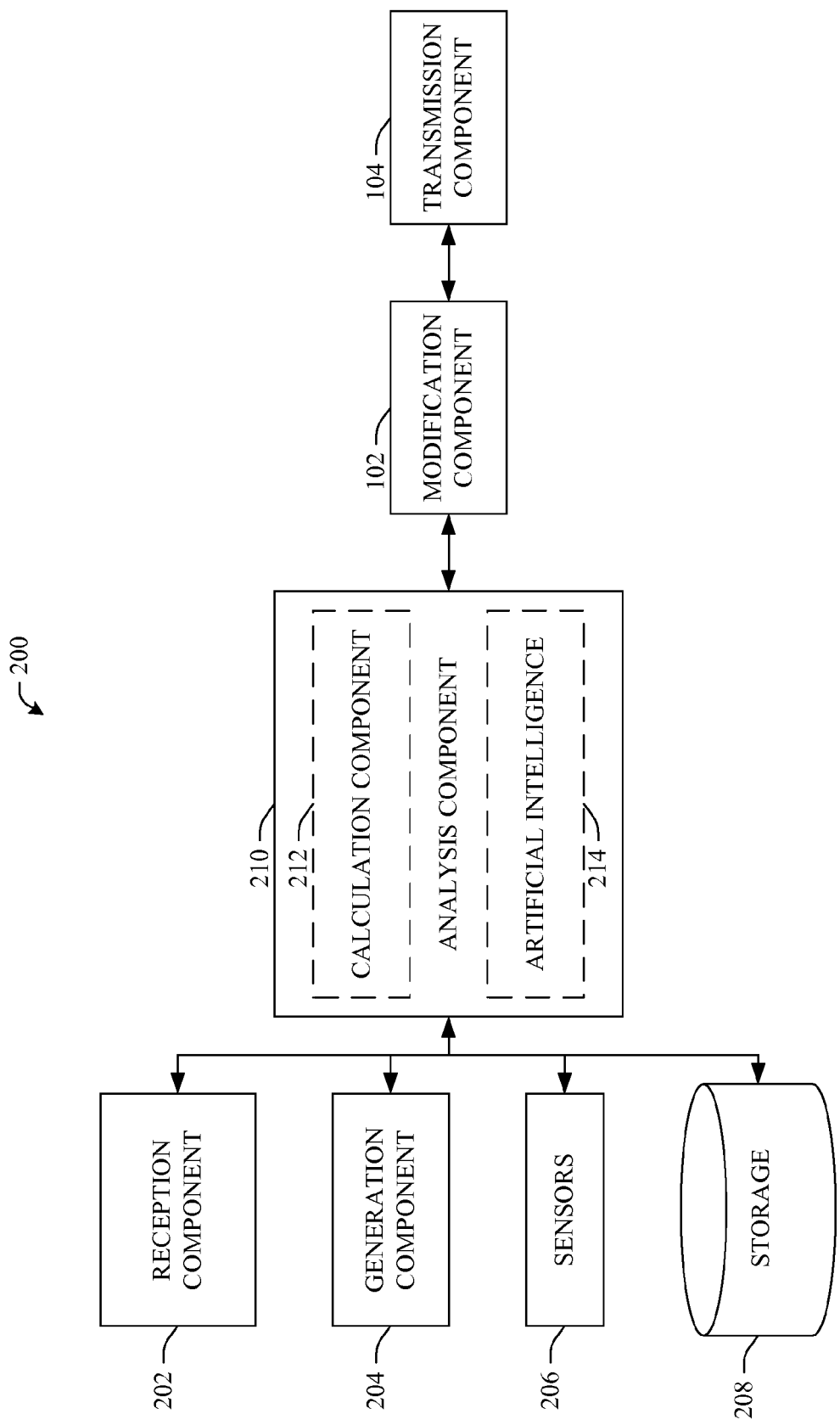
FIG. 2 illustrates a representative landmark route creation system in accordance with an aspect of the subject specification.

FIG. 2 discloses an example implementation of a system 200. The system 200 can exist on a server, on a desktop or laptop computer, on a mobile device, in a vehicle, etc. The embodiment that will be used for the duration of this example involves the system 200 being in a vehicle; however, it is to be appreciated that other embodiments can incorporate at least one aspect of disclosed examples. A reception component 202 can operate to gather information related to operation of the vehicle 200. According to one embodiment, the reception component 202 obtains a previously generated route. According to another embodiment, the reception component 202 collects information related to generating a route (e.g., start point, destination point, fuel storage operation policy, etc.) The reception component 202 obtains information that concerns creation of a route and can obtain the route from an auxiliary location.

A generation component 204 can create a route from information gathered through the reception component 202 and/or through other means (e.g., sensors 206). Route generation can take place through a number of different embodiments. According to one embodiment, a route can be generated to maximize an amount of a fuel resource. According to another embodiment, a route is generated based on allowing a vehicle to reach a location in the shortest amount of time.

Sensors 206 can determine information that relates to operation of the vehicle 200. At least one sensor 206 can collect information utilized in modification of the route. For example, vehicle speed determined through the sensors 206 can be used in determining if a landmark will be noticed by a user. Sensors 206 (e.g., engine, internal and external temperature, tire pressure, tire wear, terrain sensors, vibration, noise, air quality, power meters, fuel sensors, energy levels, energy utilization, user stress, user feedback, voice recognition, facial recognition, gesture recognition, language parsers, text input etc.) are employed to collect information relating to the vehicle, a driver, passengers, environment, etc. The sensors 206 can include video perception sensors and audio perception sensors that provide information concerning lighting, sings, buildings, distractions (e.g., a band playing an operator will likely hear that will pull attention away from a landmark), etc. It is to be appreciated that a system 200 can function without utilization of sensors 206.

Storage 208 retains information related to operation of the vehicle 200. This can include information concerning the reception component 202, the generation component 204, as well as the sensors 206. Furthermore, the storage 208 can hold information concerning other components of the vehicle, including an analysis component 210, the modification component 102 and the transmission component 104. The storage 208 can hold a landmark database that is used in integration of landmark information to a route.

An analysis component 210 receives and processes information from the aforementioned components and the extrinsic data. The analysis component 210 can perform an operation upon information related to the route. The analysis component 210 can utilize a set of models (e.g., driver behavior model, vehicle model, terrain model, energy source model, etc.) in connection with determining or inferring which set of landmarks to apply to a route. The models can be based on a plurality of information (e.g., driver behavior, vehicle performance, predicted and/or sensed traffic flow speeds, etc. . . . ). Over time, the respective models will become trained to facilitate landmarks that are of use to an operator.

The analysis component 210 can include a calculation component 212 that assists in making determinations based on landmarks. The calculation component 212 can perform at least one estimation in relation to an operator perception of a landmark, where the estimation is used in integration of landmarks upon the route. For example, a landmark can be one mile away, 100 feet tall, is tallest structure in an area, and weather can be clear. The calculation component 212 makes an estimation that an average user of a vehicle will be able to see and recognize a landmark from X feet away.

An optional learning and reasoning system, referred to as artificial intelligence 214, can be employed by the analysis component 210 in connection with making determinations or inferences regarding landmark application. According to one embodiment, artificial intelligence 214 can take an output of the calculation component 212 and make a determination if adding a landmark in directions will be of use for an operator of a vehicle. For example, the calculation component 212 can be determine that a landmark will be appreciated by an operator 3 feet before arriving at the landmark. If the operator is traveling at sixty miles per hour, then the artificial intelligence 214 can determine that the landmark should not be entered into a direction set since it will not be appreciated until it is too late for an average use to act upon a recognition.

Artificial intelligence 214 makes an inference and/or determination on what landmark information to integrate upon the route. The artificial intelligence 214 can employ for example, a probabilistic-based or statistical-based approach in connection with making determinations or inferences. The inferences can be based in part upon explicit training of classifier(s) (not shown) before employing the system 100, or implicit training based at least upon a vehicle's, or user's previous actions, commands, instructions, and the like during use of the system. In addition, explicit training can take place from a community of operators (e.g., operators with similar demographic information to a user that commonly operates a vehicle utilizing the system 200.) Explicit training can take place with an operator that commonly uses a vehicle with the system 200 being part of the community of operators as well as the operator not being part of the community of operators. Data or policies used in optimizations can be collected from specific drivers or from a community of drivers and their vehicles.

Artificial intelligence 214 can employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

Methods also include methods for the capture of logical relationships such as theorem provers or more heuristic rule-based expert systems. Inferences derived from such learned or manually constructed models can be employed in optimization techniques, such as linear and non-linear programming, that seek to maximize some objective function. For example, maximizing the likelihood an operator will perceive a landmark, minimizing the amount of time it will take an operator to notice a landmark, and so on. The artificial intelligence 214 can operate as a means for determining a probability of usefulness of at least one identified landmark.

Artificial intelligence 214 can take into consideration historical data, and data about the current context, such as the recently observed trajectories and velocities of a vehicle 200, calendar information, time of day and day of week, state of the vehicle 200 and its energy subsystems, state and intentions of the user (inferred or asserted explicitly), state of a highway or more global road system, etc. and can compute the expected utilities of different landmark modifications. Such modifications consider the cost of making an incorrect determination or inference versus benefit of making a correct determination or inference (e.g., placing a semi-temporary landmark that is easily distinguishable; for example "take a right at the hot pink house" could be wrong if the house is now painted a different color). Accordingly, an expected-utility-based analysis can be used to provide inputs or hints to other components or for taking automated action directly. Ranking and confidence measures can be calculated and employed in connection with such analysis.

The analysis component 210 can take into consideration terrain information from terrain maps through indexing of global positioning system information. One consideration can be near-term, local terrain and context. Another consideration can be information (e.g., direct information, inferred information, etc.) about longer-term routes, up to and including a destination. For example, the analysis component 210 can consider a map of a possible route that can obtain data from a global positioning system in determining an operation policy. That can include both information of nearby terrain as well as information about terrain that will be encountered in a relatively long distance.

There can be computation of visual and visceral perceptions of landmarks through an analysis component 210 (e.g., based off typical speeds and geometric information.) For example, given expected velocities, the analysis component 210 computes whether or not a driver will experience or notice a potentially useful landmark such as the start or end of a fast climb or the start of a downhill segment or the bottoming out of such a drop. There can be further computations concerning where a driver would feel a tight curve, or a rough road. The analysis component 210 can report where and when (e.g., in time from a current position), landmarks would be first revealed or first become occluded based on a line of sight analysis, using information about the location and topology of roads during a trip. Geometric projections can be used to compute line-of-sight analyses Furthermore, the analysis component 210 can consider perceptual salience of different kinds of landmarks, and also contextual changes in the salience of landmarks; for example, the salience of different kinds of landmarks for navigating at different times of day, and seasons of the year, thus modifying landmarks based on weather and lighting. For example, landmarks that are salient in the daytime will not be salient in the evening—and vice versa (e.g., for evening a system may indicate, "Make a left turn at the large street right after you first see a lighted steeple of the Morman temple"), and the date and time of travel (e.g., for considering when the sun will have set) can be considered to generate navigational plans that include perceptual landmarks.

The analysis component can include a calculation component 212 that creates functions that serve as transformations from driving coordinates to perceptual landmarks, which can automatically take into consideration such widely available information as topological data, United States Geological Survey "land types" data, geographical features, resources (e.g., available in databases about buildings, malls, shops, etc.), and to combine database information with road contour and geometry information.

Topological analysis and speeds can also tell where and when people would feel a big climb starting or an obvious dip in the road. Improperly lit areas can be discovered and called out or avoided in directions. Lack of signage can be recognized and relayed in directions. Methods employed by the analysis component 210 can include volatile or "non-stationary" perceptions, based on the dynamics of the context, or on conditional states; for example, how the sun falls based on time of day, how things appear or disappear with changes in weather (e.g., on clear days, you'll see . . . ). These can be combined with other "more traditional" features such as commercial landmarks, shops, etc.

There can be an extension by defining and automatically finding and triaging the most useful landmarks on a trip, e.g., landmarks are things that may be quite rare, versus commonplace, etc. The analysis component 210 compute measures of perceptual salience based on automated analysis of typical and atypical objects and structures. Analysis can also include cognitive issues, such as the ease with which something might be recognized with minimal distraction to driving, etc., considering such notions as the cognitive load with recognizing different kinds of landmarks.

There can also be a modification component 102 that changes a route. According to one embodiment, the generation component 204 creates a generic route from moving between a start point and a finish point. The analysis component 210 makes various determinations based on the generated route. For example, the analysis component can determine where on the path there will be a high hill. Moreover, the analysis component 210 can utilize artificial intelligence 214 in determining which landmarks to employ in the route. For example, a first hill with a 20% grade could be determined as useful while a hill with a 1% grade would likely go un-noticed by an operator.

Selected landmarks and the route can transfer to a modification component 102. The modification component can change the route information to include selected landmark information. For example, the modification component 102 can add to directions "make a right on E. 9th Street that is at a bottom of a hill" (emphasis added.) Furthermore, there can be a transmission component 104 that sends a modified route to an auxiliary location.

Scores can be used by the analysis component 210 in determining what landmarks should be part of a modified route. Scores can be calculated based on static properties of the landmark, and the relationship of the landmark to the route. Furthermore, the storage 208 can function as a database of business landmarks and associated static scores. According to a different embodiment, the storage 208 is located separate from the vehicle 200 and accessed through the transmission component 104. For example, the analysis component 210 can employ scoring on a database located upon the storage 208. Some businesses make better landmarks then others. Therefore, specific rules can be applied to landmarks to create a score for the landmark.

The following are a number of rules that can be employed by the analysis component 210. There can be employment of a rule that determines if the business is part of a chain. A business that is part of a national chain is likely to be more recognizable then a local business. Therefore, the analysis component 210 can score a national chain business higher then a regional chain business. The analysis component 210 can operate as a means for selecting at least one landmark to augment upon directions based on determined probability of usefulness of at least one identified landmark.

The analysis component 210 can have a rule that adjusts a score of a business based on its category. Different businesses can classify into different categories and businesses in the categories can have different traits that relate to usefulness as a landmark. For example, a gas station commonly has a highly lit sign toward the edge of a street; this could be useful as a landmark and can be scored highly. However, a telemarketing business commonly has little to no signs, so there would be a low score.

A rule based on context can be used to influence a score for a business. For example, a business could be a recognizable business with distinctive trademarks known worldwide. However, if the business is located within a shopping mall, it will be of virtually no use to an operator since the operator will not be able to see the business and/or appreciate the business in time to act upon the landmark. Therefore, the business, despite its notoriety can be given a low score.

A rule based on visibility can also influence how a business is scored. This can take into account information such as business footprint, orientation, distance from the road, obstructions (e.g., tree branches covering signs), etc. One embodiment of determining a business' visibility from the road involves the use of image recognition of names or logos from street-side imagery. The artificial intelligence 214 can make an inference or determination on what landmarks to use based on the score. However, the artificial intelligence 214 does not have to use score alone in determining what to place into a modified route. For example, the sensors 206 can determine the vehicle 200 is low on fuel. Therefore, despite possibly having a lower score, a re-fuel station can be provided as a landmark since it can serve two purposes (e.g., being distinctive and providing a place to re-fuel.) It is to be appreciated that while specific rules are disclosed, other rules can be used in providing a score to a landmark.

A rule based on a user profile or history can influence a score of a business. For example, if a user has been to a coffee shop of company A on a previous route, they are likely to recognize another coffee shop of company A. In another example, if they are an avid coffee drinker, they are also likely to recognize a coffee shop of company A.

A rule based on proximity to key features of the route can be used to affect how a business is scored. Businesses near corners where the route turns are more beneficial than ones along side a road between turns. Businesses near the end of a route are more useful as users tend to get directions from known locations, to unknown ones.

The artificial intelligence 214 can operate as a means for placing a score on at least one landmark. Commonly, this is done through application of previously mentioned rules. The analysis component 210 can function as a means for selecting a landmark for integration into a route based at least in part on the score. This can include selecting the highest score as well as placing different weights on scores and/or score portions.

According to one embodiment, the artificial intelligence 214 of FIG. 2 can select a preferred, if not optimal, landmark for a specific turn or action. For example, an ideal landmark can come just before a turn on the same side of the street as the turn. Business can be an ideal choice, assuming it scored reasonably well for visibility. For example, an instruction can take place "Turn Right on 2nd Ave, just after the gas station on your right". However, there can be a more factors to consider when weighing landmarks for selection based on geography and commonly it is hard to find an ideal landmark. Therefore, weights should be applied to determine a proper landmark.

For example, the artificial intelligence 214 of FIG. 2 can determine that a more visible landmark is more likely to be useful then a close landmark. In this example, the Empire State Building 2 blocks away can be more useful then a local yarn store one block away. While components are shown to operate as separate entities, it is to be appreciated components disclosed in the subject specification can integrate together and operate as one unit.

Figure 3:
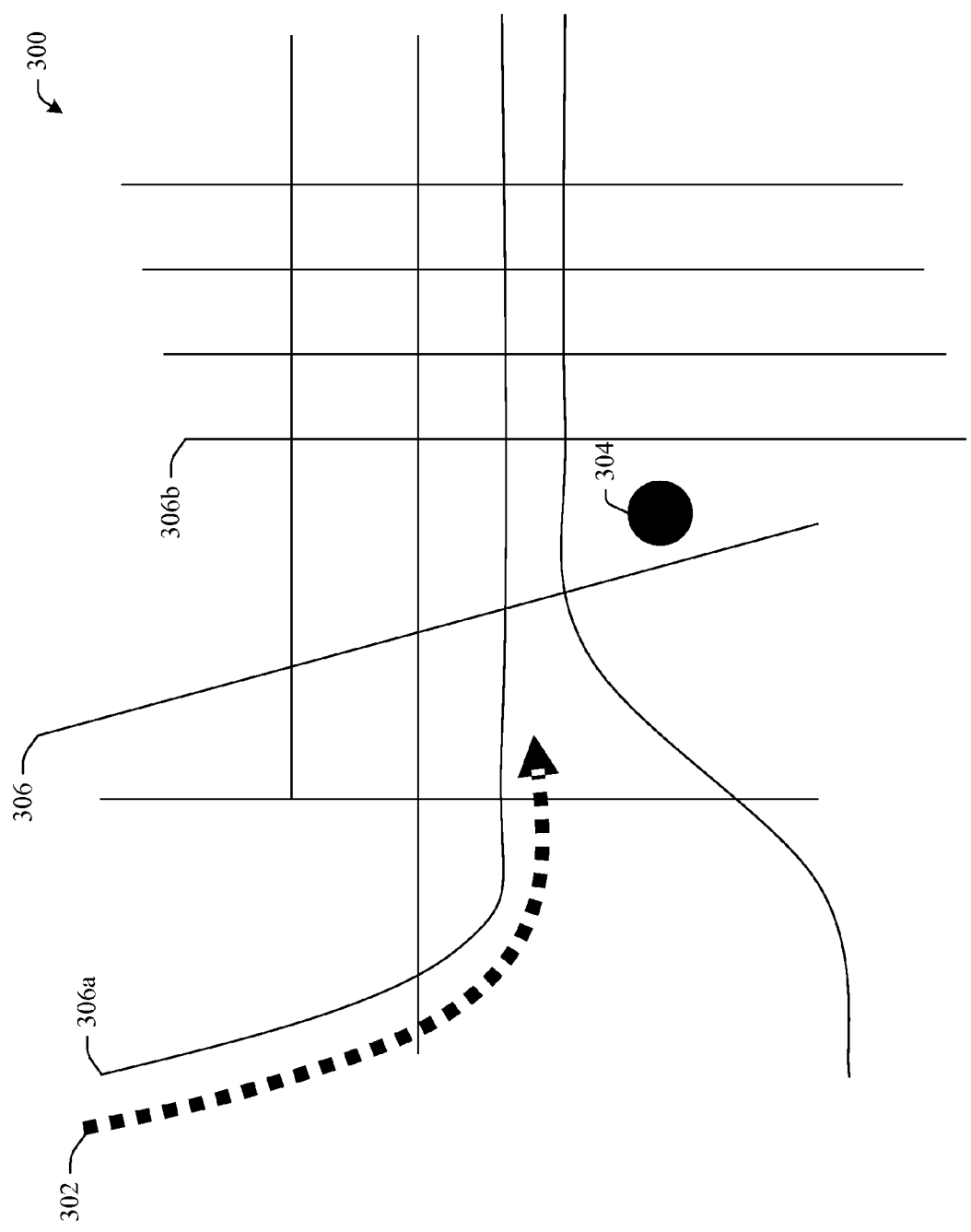
FIG. 3 illustrates a representative map in accordance with an aspect of the subject specification.
Figure 4:
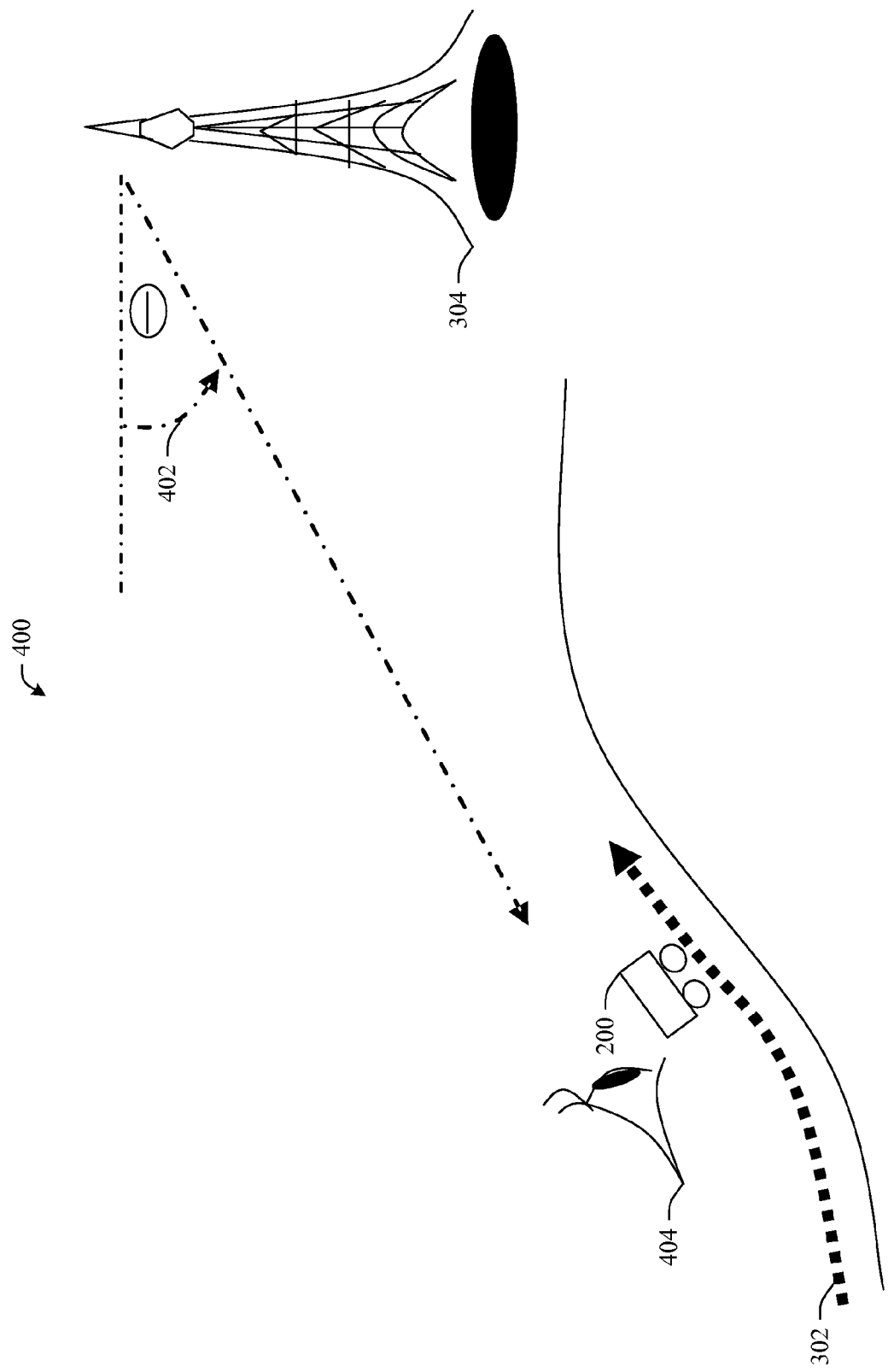
FIG. 4 illustrates a representative landmark identification in accordance with an aspect of the subject specification.

FIG. 3 to FIG. 5 discloses example operations of the vehicle 200 of FIG. 2. The calculation component 212 of FIG. 2 can also generate a list of sets of functions that take databases of information and convert these in an automated or semi-automated manner into visual and other perceptions. For example, the heights of structures and topology of natural and artificial aspects of terrain combined with optical analysis can tell where and when on a trip structures (e.g., the Eiffel Tower, etc.) or natural features (e.g., lakes, hills, etc.) would be revealed.

FIG. 3 discloses an example view of a geographical area from an above view 300. A route 302 with a landmark 304 can be used to traverse a series of paths 306 (e.g., roads, bicycle trails, hiking areas, etc.) Different paths can cross-sect at different angles and a user not familiar to an area can become lost. A landmark 304 can be beneficial in assisting a user to find a way. For example, an operator can be traveling down path 306*a* and have a desire to turn onto path 306*b*. The route 302 can guide the operator down path 306*a*. The landmark can be used to distinguish to the operator when path 306*b* is approaching (e.g., turn right at the landmark.) FIG. 3 assists in showing how a landmark can be used to traverse a complex set of paths.

FIG. 4 discloses an example geometric analysis 400. This considers visual angle 402, landmark 304 size and height, and contours, typical velocities, and timing of revelation of landmark to vehicle 200 of FIG. 2 with an observer 404. Geometric analysis can be performed by the analysis component 210 of FIG. 2. The analysis component 210 can operate as a means for identifying landmarks based on visual effectiveness (e.g., how likely a user is to see, recognize, process, and/or identify a landmark, etc.)

Figure 5B:
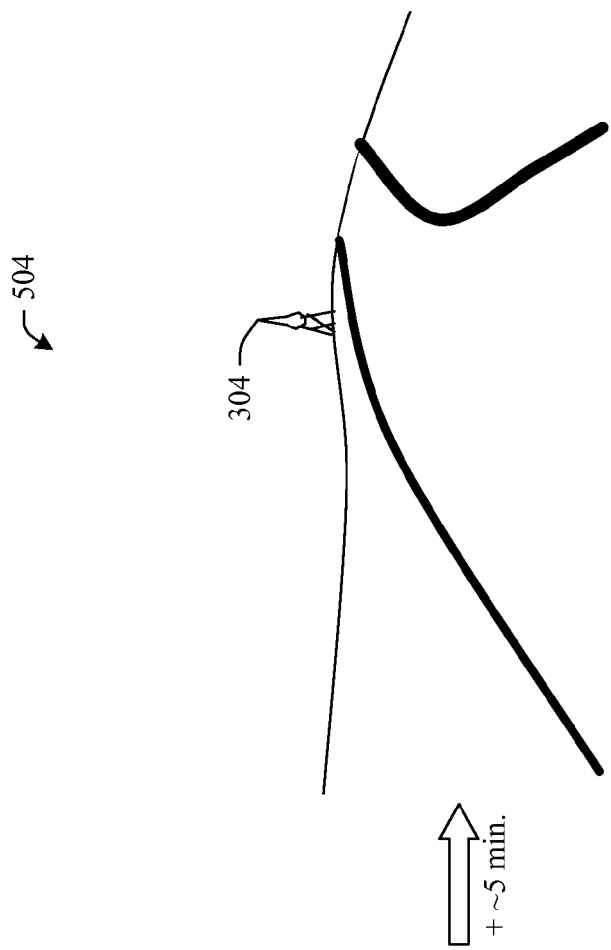
FIG. 5b illustrates a representative route with a landmark in accordance with an aspect of the subject specification.
Figure 5A:
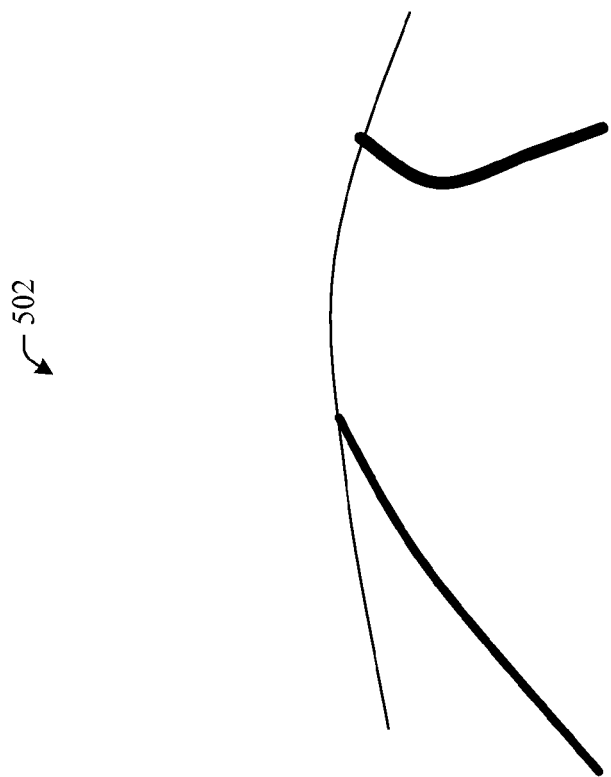
FIG. 5a illustrates a representative route in accordance with an aspect of the subject specification.

FIG. 5a discloses an example driver view 502 when receiving an instruction. FIG. 5b discloses an example driver view 504 in accordance with the instruction. For example, The analysis component 210 of FIG. 2 can compute an operator's view, identifying when the landmark 304 will first become perceived, given contours, heights, relative distance, etc. For example, FIG. 5a can associate with a command "In about five minutes, you will see the top of the Eiffel Tower ahead. At this point, prepare to make a sharp right turn within 100 meters." FIG. 5b shows an operator view after about five minutes.

Figure 6:
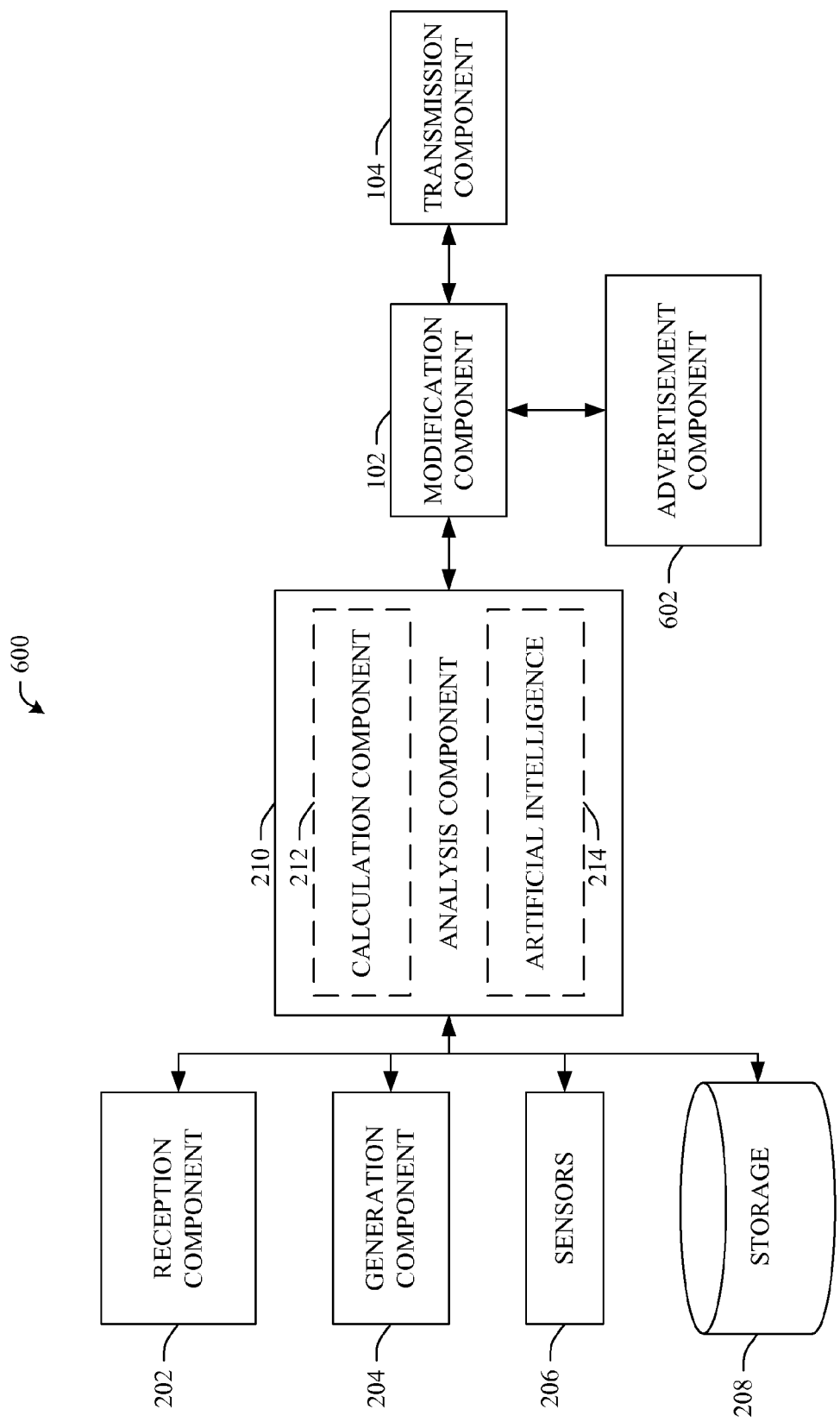
FIG. 6 illustrates a representative vehicle with an advertisement component in accordance with an aspect of the subject specification.

FIG. 6 discloses an example vehicle 600 with an advertisement component 602. The reception component 202 obtains information related to the vehicle 600. The generation component 204 can create a route that the vehicle should take. The sensors 206 collect information about the vehicle operation. Storage 208 holds information in determination of modifications as well as analysis of a route. An analysis component 210 performs operation upon a route to determine landmarks to add to route instructions. The analysis component 210 can be assisted by a calculation component 212 that assists in referencing landmarks and artificial intelligence 214 that makes inferences and/or determinations based on the route.

A modification component 102 can add landmark identifiers to a route processed through the analysis component 210. The modification component 102 can relay on information related to the advertisement component 602 in modifying a route, thereby including announcements and landmarks in a presented route. Commonly, an announcement is commercial in nature that is specifically directed at the operator. For example, a user could be traveling to a sports stadium. An announcement can be incorporated into the route listing a restaurant near the stadium (e.g., the instruction 'make a left at Main Street Deli.') Furthermore, the announcement can include auxiliary information (e.g., 'make a left at Main Street Deli, home of the famous jumbo corned beef sandwich.')

According to one embodiment, the announcements are presented in addition to directions. For example, while listing directions, advertisement data can also be provided (e.g., turn left at Main Street by the large oak tree, and if you are hungry, grab a sandwich at Main Street Deli). A transmission component 104 transfers information to an operator. The transmission component 104 can interact with the operator. For example, the transmission component 104 can be a display screen. A button can be touched by the user that changes the route (e.g., from here, these are directions to the Main Street Deli.)

The advertisement component 602 can supply at least one announcement related to a landmark. The modification component 102 can assimilate at least one announcement related to the landmark upon a route. Furthermore, the modification component 102 can integrate landmark information upon the route. The reception component 202 can operate as a means for receiving at least one offer for presentment of an announcement related to at least one landmark (e.g., receiving offers from companies to use their store as a landmark, etc.) The analysis component 210 can operate as a means for selecting at least one offer for presentment. For example, the analysis component 210 can select an offer that is associated with the most money. The artificial intelligence 214 can function as a means for evaluating at least one offer for presentment of the announcement. For example, the artificial intelligence 214 can determine if an announcement is inappropriate (e.g., an advertisement for an over-21 age dance club when the operator is 17 years of age.)

Figure 7:
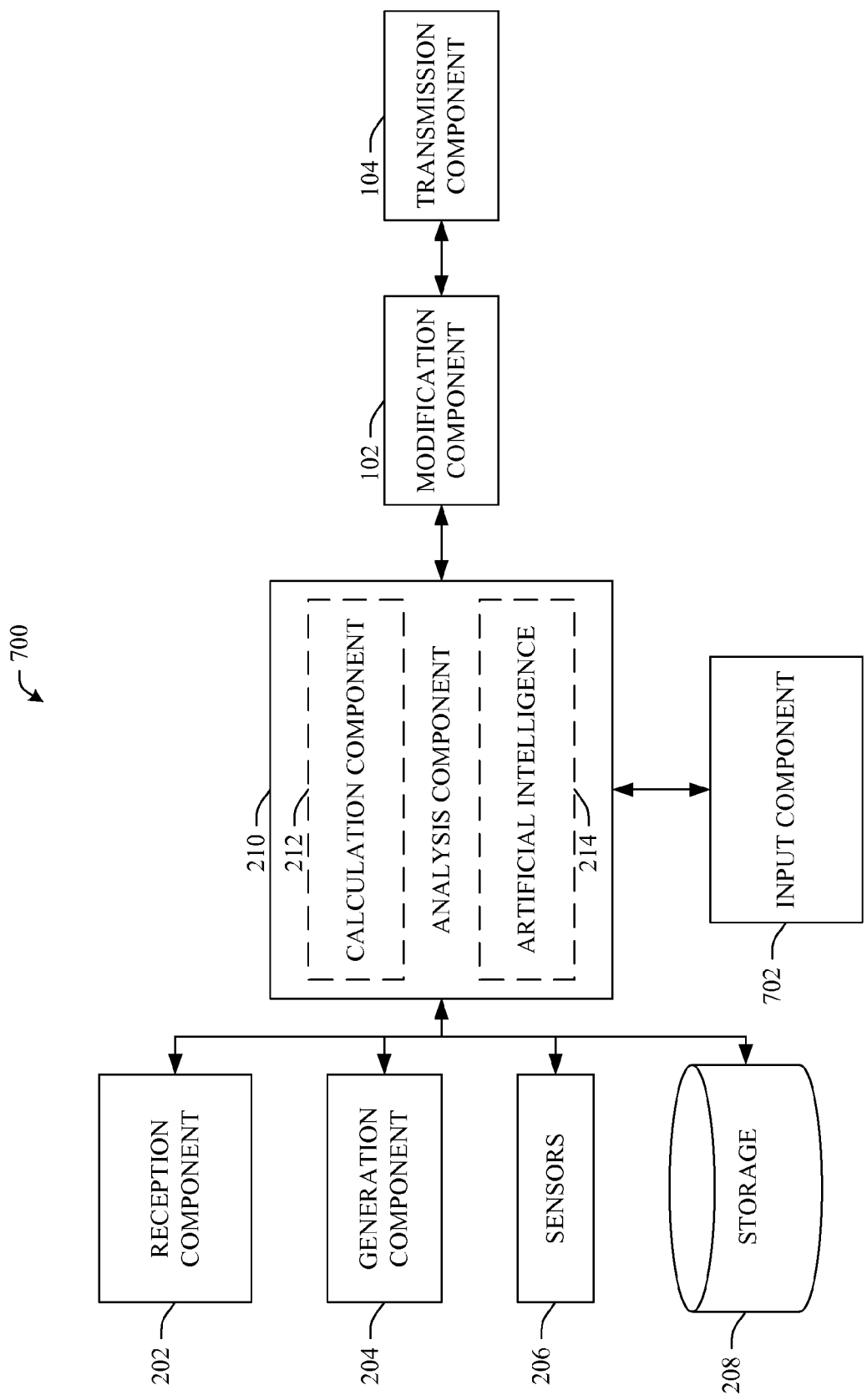
FIG. 7 illustrates a representative vehicle with an input component in accordance with an aspect of the subject specification.

FIG. 7 discloses an example vehicle 700 with an input component 702 (e.g., a graphical user interface). The reception component 202 obtains information related to the vehicle 600. The generation component 204 can create a route that the vehicle should take. The sensors 206 collect information about the vehicle operation. Storage 208 holds information in determination of modifications as well as analysis of a route. An analysis component 210 performs operation upon a route to determine landmarks to add to route instructions. The analysis component 210 can be assisted by a calculation component 212 that assists in referencing landmarks and artificial intelligence that makes inferences and/or determinations based on the route.

A user can interact with the vehicle through the input component 702. The input component can take form of a number of different embodiments. According to one embodiment, the input component 702 is a display that can interact from user touch. In another embodiment, the input component 702 is a handheld device (e.g., cellular telephone, personal digital assistant, etc.) that connects to the vehicle. Connection to the vehicle 200 can be wireless or wired.

The user can input information related to driving directions. For example, a user can request directions for a route to a building never before visited by a user to a downtown area frequently visited by the user. Conventional systems can direct the user to the building without concern to what a user knows.

The analysis component 210 can access from storage 208 that the user has been to the downtown area in previous interactions of the vehicle 700. The analysis component 210 can utilize the artificial intelligent 214 to make inferences and/or determinations based on what areas are familiar to the user. Continuing the previous example, the user can never have been to a downtown office building, but has been to a downtown sports stadium three blocks away numerous times. Therefore, the analysis component 210 can provide a route that takes the user on a route toward the stadium (e.g., a route the user knows), and then provides directions from the stadium to the building. It is to be appreciated a route can take a user near a familiar location while not necessarily to the location. For example, if the user knows the way to a stadium, then the route can take the user 80% toward the stadium and then use new directions. Furthermore, the analysis component 210 can take a user on completely unfamiliar paths by using other consideration (e.g., fastest time, risk factors, etc.)

According to another embodiment, the user can enter information through the input component 702 concerning intermediate landmarks. Directions can be based on intermediate landmarks; the user can select familiar intermediate landmarks for utilization in presenting directions. Directions can be provided from intermediate landmarks; this does not give the user excess information and does not force the vehicle 700 to use extra resources computing information already known to the user. The input component 702 can obtain information from the user that is employed in creation of the route.

The input component 702 can obtain from a user at least one landmark that relates to a desired destination. For example, a structure that is within 'X' distance of an end location. The destination is classified as desired since there is no guarantee a vehicle will arrive at a destination (e.g., user changes her mind, vehicle is in an automobile accident, frustration of purpose, etc.) Furthermore, the input component 702 can obtain information from the user that relates to a user profile. For example, an operator can input their name to the vehicle 700. A profile relating to the name that relates to previous engagements of the vehicle can be retrieved from storage 208. The profile can be used in determining what landmarks are familiar to the operator. Since the operator provided information for the profile, the input component obtained a landmark from the user indirectly through a profile in storage. The modification component 102 can incorporate a user landmark in a route.

Figure 8:
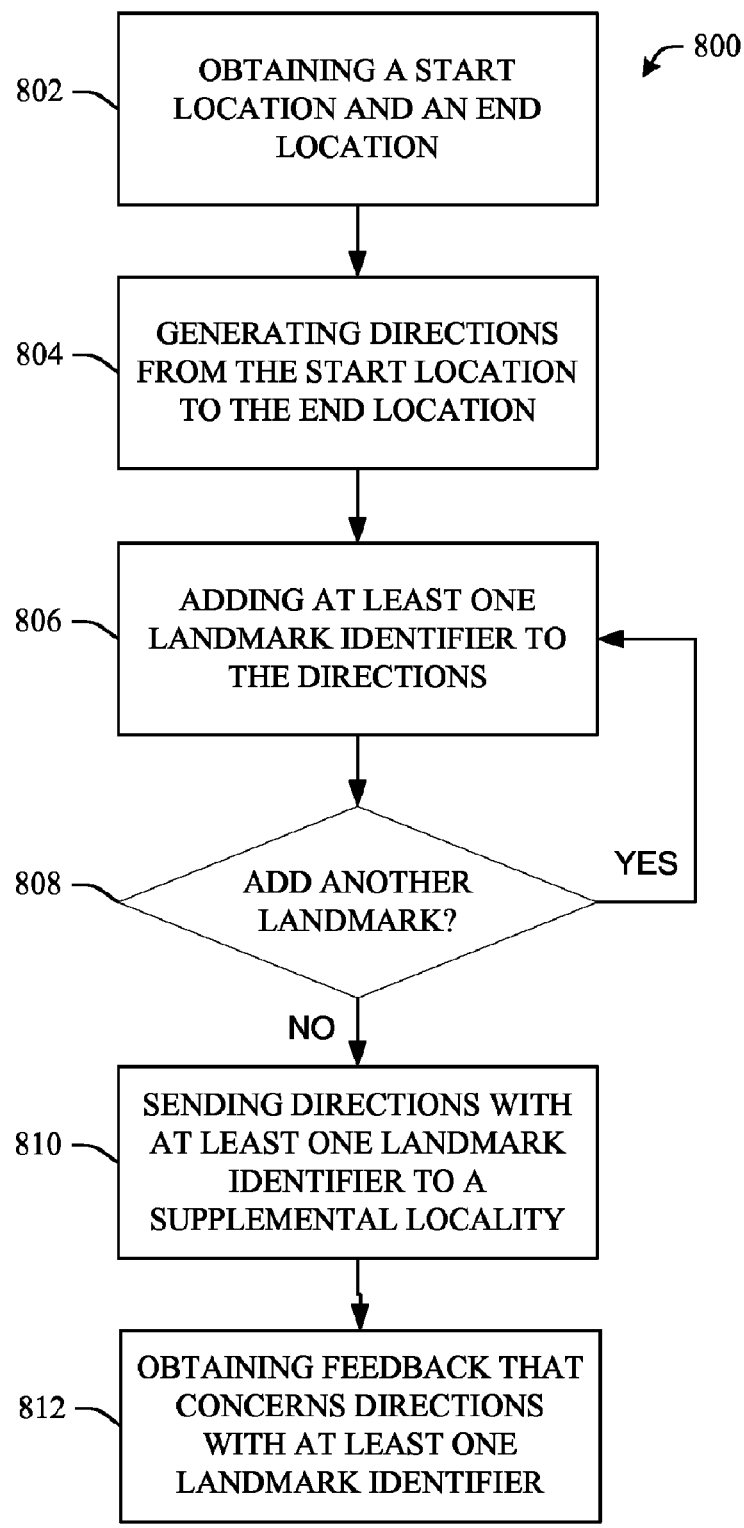
FIG. 8 illustrates a representative route modification methodology in accordance with an aspect of the subject specification.

FIG. 8 is an example route modification methodology 800. The methodology 800 can include obtaining a start location and an end location 802. The end location does not have to be where a vehicle ultimately arrives, but a hypothesized location after the start location. This can take place according to a number of different embodiments. According to one embodiment, an operator enters into a vehicle a specific start location and/or end location. According to another embodiment, there can be intelligent estimations on start and end locations. For example, at a certain time a vehicle can commonly travel between locations (e.g., at 8 a.m. on a weekday, the vehicle commonly travels from an operator home to an employment location.) This can be obtained from storage of from an auxiliary location (e.g., personal digital assistant integrated with a calendar of events related to a user.)

There can be generation of directions from the start location to the end location 804. Generation of directions can take place from a number of different embodiments. According to one embodiment, the vehicle generates directions locally based on the start location and the end location. According to another embodiment, directions are received from a remote location.

Action 806 is adding at least one landmark identifier to the directions. Landmark identifiers assist in allowing a vehicle operator to have a greater understanding of the surroundings. Therefore, a single line of the directions can be 'Turn Right on Market Street, Market Street is located at the bottom a second steep hill you will encounter.' This allows an operator to appreciate the surroundings and minimizes a likelihood the user will become lost.

Checking if a subsequent landmark should be added to the directions if after addition of a previous landmark 808 can take place. This can take place according to a number of different embodiments. According to one embodiment, a calculation can take place to determine if directions have an adequate number of landmark references. For example, particular roads, routes, etc. can have different likelihoods of a user becoming lost. A higher likelihood can signal that a direction set should have a higher number of landmarks. A particular road can have a high likelihood and a direction set can have one landmark. Action 808 determines that another landmark should be added to lower a driver risk of becoming lost.

If an additional landmark should be added, then there can be adding a subsequent landmark to the directions, thus returning the methodology to action 806. For example, a highly confusing direction set should be augmented with more landmarks. If a direction set does not have enough landmarks (e.g., there is one landmark for a twenty mile journey that has a history of confusing drivers), then there can be an addition of at least one more landmark. This can reiterate for a third landmark, fourth landmark, etc.

The methodology 800 can engage in sending directions with at least one landmark identifier to a supplemental locality 810. Different supplemental localities can be used, including a printer or a display screen of a vehicle. Furthermore, sending can take place locally (e.g., from inside a vehicle to an integrated display screen of the vehicle) or remotely (e.g., from a database server.)

There can also be obtaining feedback that concerns directions with at least one landmark identifier 812. It is possible that directions supplied to a user are of little value. Landmarks could have changed, could have been hard to find, the operator could have traveled too fast to notice them, etc. Therefore, obtaining feedback allows for adding at least one landmark identifier to directions 806 with knowledge of effectiveness of certain landmarks. Adding at least one landmark identifier to the directions 806 can include training logic to add and/or deny certain landmarks based on obtained feedback. Furthermore, obtained feedback can be passive. For example, if a user did not take directions provided through the methodology 800, then a notation can be made and feedback information can be used in action 806.

Figure 9:
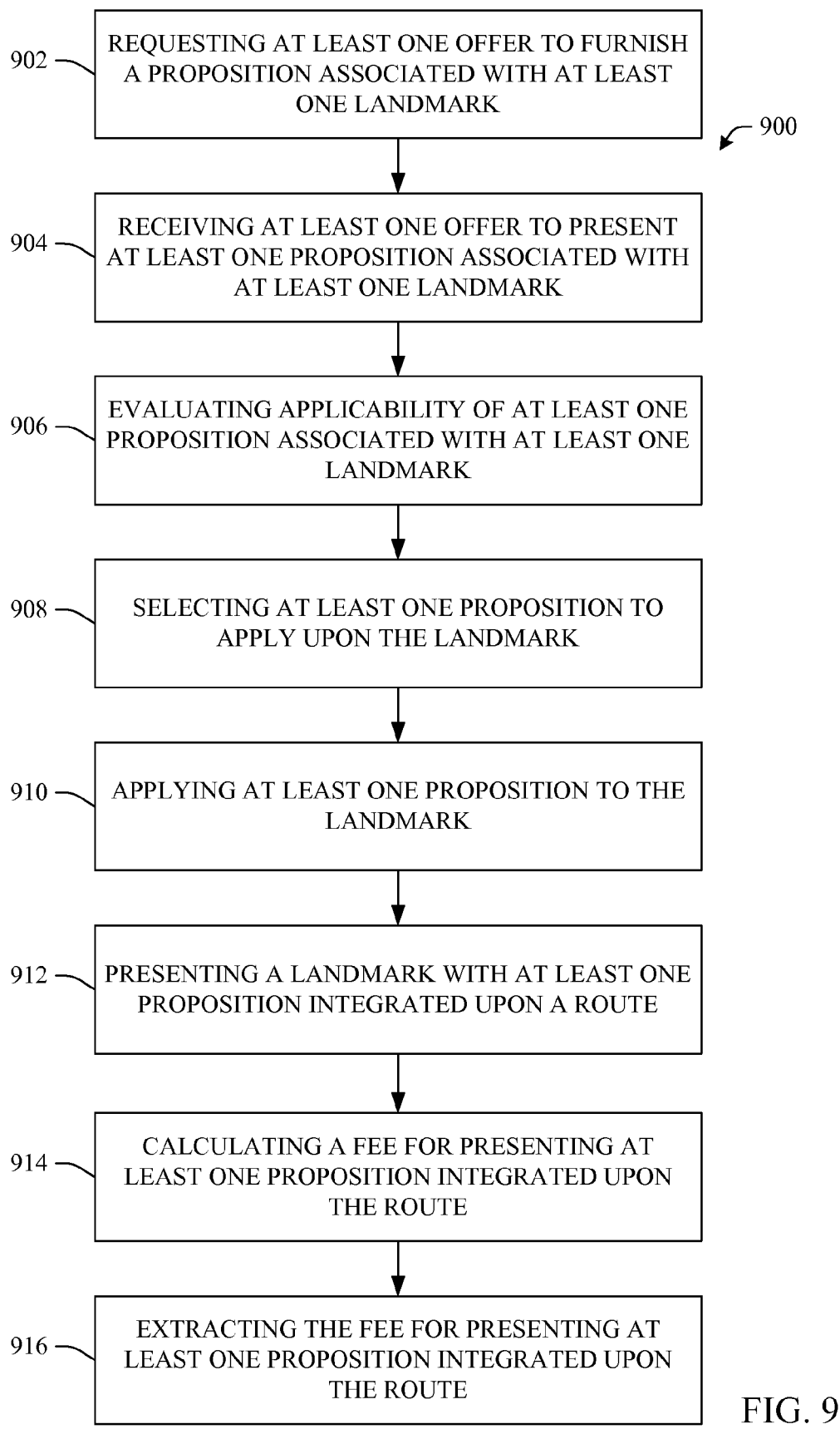
FIG. 9 illustrates a representative landmark advertisement methodology in accordance with an aspect of the subject specification.

FIG. 9 is an example landmark advertisement methodology 900. Action 902 is requesting at least one offer to furnish a proposition associated with at least one landmark. For example, a vehicle can be low on gasoline and this can be identified by at least one sensor. A request can be transmitted to advertisers to supply an advertisement associated with a gas station. In this example, there can be an intersection with four gasoline stations. The companies that represent the gasoline stations can be asked if they would like to pay to have their advertisement integrated with a gas station landmark. This example will be continued through some other actions of the methodology 900.

Receiving at least one offer to present at least on proposition associated with at least one landmark 904 can take place. This is commonly a straight acceptance (e.g., no negotiation.) However, it is to be appreciated that the offer can be a counter offer and actions 902 and 904 can repeat to conduct a negotiation. A rejection can be an offer to present for no money. According to one embodiment, the offer originates not from and advertiser, but a related body (e.g., a vehicle manufacturer supplies an offer based on contracts with other companies.)

There can be evaluating applicability of at least one proposition associated with at least one landmark 906. For example, if a response is received once the intersection has been passed, then the advertisement would be inapplicable. In another situation of the example, the action 902 transmitted an offer to an incorrect location (e.g., a gasoline company that does not have a station at the intersection); an acceptance of the offer would be impractical.

The methodology 900 can include selecting at least one proposition to apply upon the landmark 908. This can take place through a number of different embodiments. According to one embodiment, an advertiser offering the highest price is selected. According to another embodiment, a waiver system is used; a set price is used and an order is determined based on frequency of presentment (e.g., the advertiser with the longest duration since a previous presentment is selected.)

Event 910 is applying at least one proposition to the landmark. This associates an advertisement with a landmark. According to one embodiment, the methodology 900 engages in applying propositions that are not integrated automatically with a landmark. Therefore, an application can take place to synchronize the landmark and the proposition. For example, an application of at least one proposition to a landmark can create a direction 'take a left on Main Street at the end of the hill, and listen to Mornings with Alvin on 108.5 FM.'

There can be presenting a landmark with at least one proposition integrated upon a route 912. Presentment can take place according to a number of different embodiments. According to one embodiment, presentment is through audio speakers integrated with a vehicle radio. According to another embodiment, presentment takes place through transferring route information through a display of an electronic device (e.g., cellular telephone.)

The methodology 900 can include calculating a fee for presenting at least one proposition integrated upon the route 914. Commonly, the methodology 900 operates to present advertisements for a fee. A typical fee is of monetary value; however, it is to be appreciated that the fee can be non-monetary (e.g., exchange of advertisements; advertise gasoline for gasoline station having vehicle manufacturing advertisements, etc.)

Extracting the fee for presenting at least one proposition integrated upon the route 916 can take place. According to one embodiment, extraction takes place by direct withdrawal associated with a provider of a proposition. According to another embodiment, a note is made in accounting software of a central server by sending a request for change. The central server sends a bill to a provider after an increment of time (e.g., quarterly, monthly, etc.) Sending the request for change is considered an extraction.

In addition to this example, the process of requesting a proposition can be influenced by several other factors. For example, in addition to a location of an advertisement request, it can include the user's profile, the time of day, the length of the route, and the user's previous destinations. This information can be used to provide more optimal advertisements. Example advertisements can include: 1. Gas stations are important for medium-length routes. (Even for short routes, they are important due to their visibility). 2. Hotels are important for long routes. 3. Coffee shops are important for routes calculated in the morning. 4. Restaurants are important for routes calculated around lunch or dinner. 5. Bait & tackle stores are relevant for anglers. 6. Men's clothing stores are important for a user who has previously searched for men's clothing.

Figure 10:
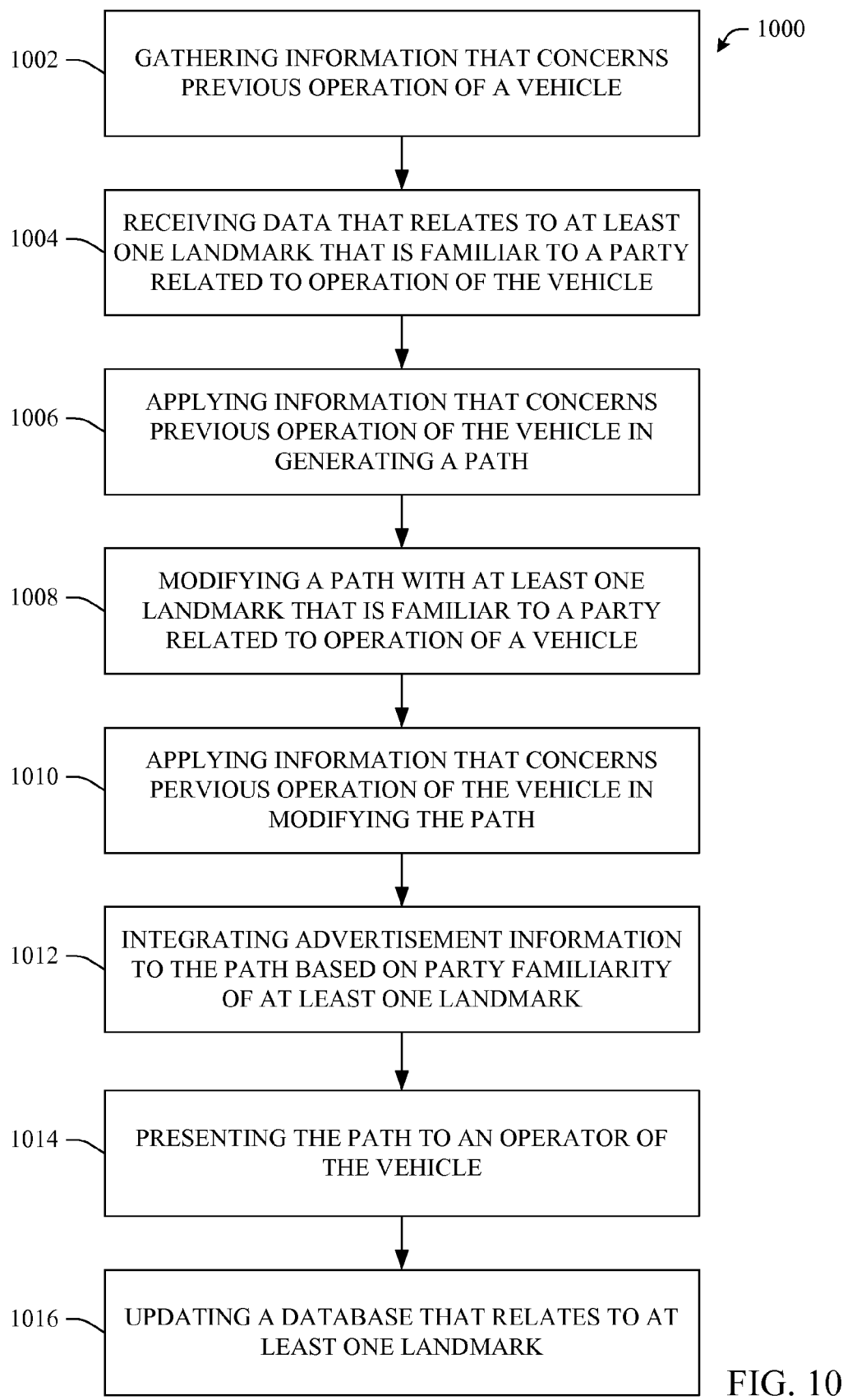
FIG. 10 illustrates a representative user interactive route presentment methodology in accordance with an aspect of the subject specification.

FIG. 10 is an example user interactive route presentment methodology 1000. A route can be preferred if it uses primarily known instructions until near the end, then a small number of additional actions to the proper destination. One embodiment of involves a relatively large number of instructions heading to a previously visited destination. Another embodiment involves the instructions heading to a prominent landmark such as a stadium. Although it is possible for these routes to not take the shortest time, a user is less likely to get lost attempting to follow these directions.

There can be gathering information that concerns previous operation of a vehicle 1002. According to one embodiment, gathering takes place through access of an internal storage component. According to another embodiment, gathering takes place through engaging an operator with questions. According to yet a further embodiment, gathering occurs through communication with an auxiliary device.

The methodology 1000 can include receiving data that relates to at least one landmark that is familiar to a party related to operation of the vehicle 1004. Commonly, a user engages an input component to inform a vehicle as to what landmarks are familiar to the user. For example, a user can input data that the user knows where a stadium is and a building the user does not know is near the stadium. According to one embodiment, a passenger of the vehicle communicates landmark information through a wireless device.

Applying information that concerns previous operation of the vehicle in generating a path 1006 can take place. For example, there can be generation of a new path for a vehicle. Applying previous operation information in path generation assists providing a greater likelihood a path will be familiar to the user. In the example, if a user has been on 'Main Street' before, then a path that includes 'Main Street' would be easier for a user to follow.

Action 1008 is modifying a path with at least one landmark that is familiar to a party related to operation of a vehicle. A generated path commonly does not include landmark information. Modifying the path with familiar landmark information enables an operator to have a greater likelihood of following directions. However, the landmark does not need to be familiar to an operator, but to a party. For example, a passenger of a vehicle can be familiar with an area and assist the operator.

The methodology 1000 can include applying information that concerns previous operation of the vehicle in modifying the path 1010. Information that relates to where a vehicle has traveled can be important in modifying a path. For example, if a user has been past 'City Hall' before, then there is a greater likelihood that the user is familiar with 'City Hall.' The path can be modified to include an instruction that relates to city hall.

There can be integrating advertisement information to the path based on party familiarity of at least one landmark 1012. If a user is familiar with a landmark, then there can be a greater likelihood the user finds a neighborhood with the landmark safe, since the user has traveled there before. Therefore, a user can be more likely to stop at a store in the neighborhood since the user considers the neighborhood safe. Advertisements can be added to the path that relate to the landmark. Advertisements can be both commercial and non-commercial in nature.

Event 1014 is presenting the path to an operator of the vehicle. Presentment can take place according to a number of different embodiments. According to one embodiment, presentment is printing a physical copy. According to another embodiment, presentment is saving a copy of the path on an auxiliary device.

Action 1016 is updating a database that relates to at least one landmark. It can be beneficial to keep a record of what landmarks have been visited by the user. Landmarks visited by a user can be more likely to be familiar to the user. This can save resources by not having to ask the user as well as providing convenience to the user since the user is bombarded with fewer questions.

Figure 11:
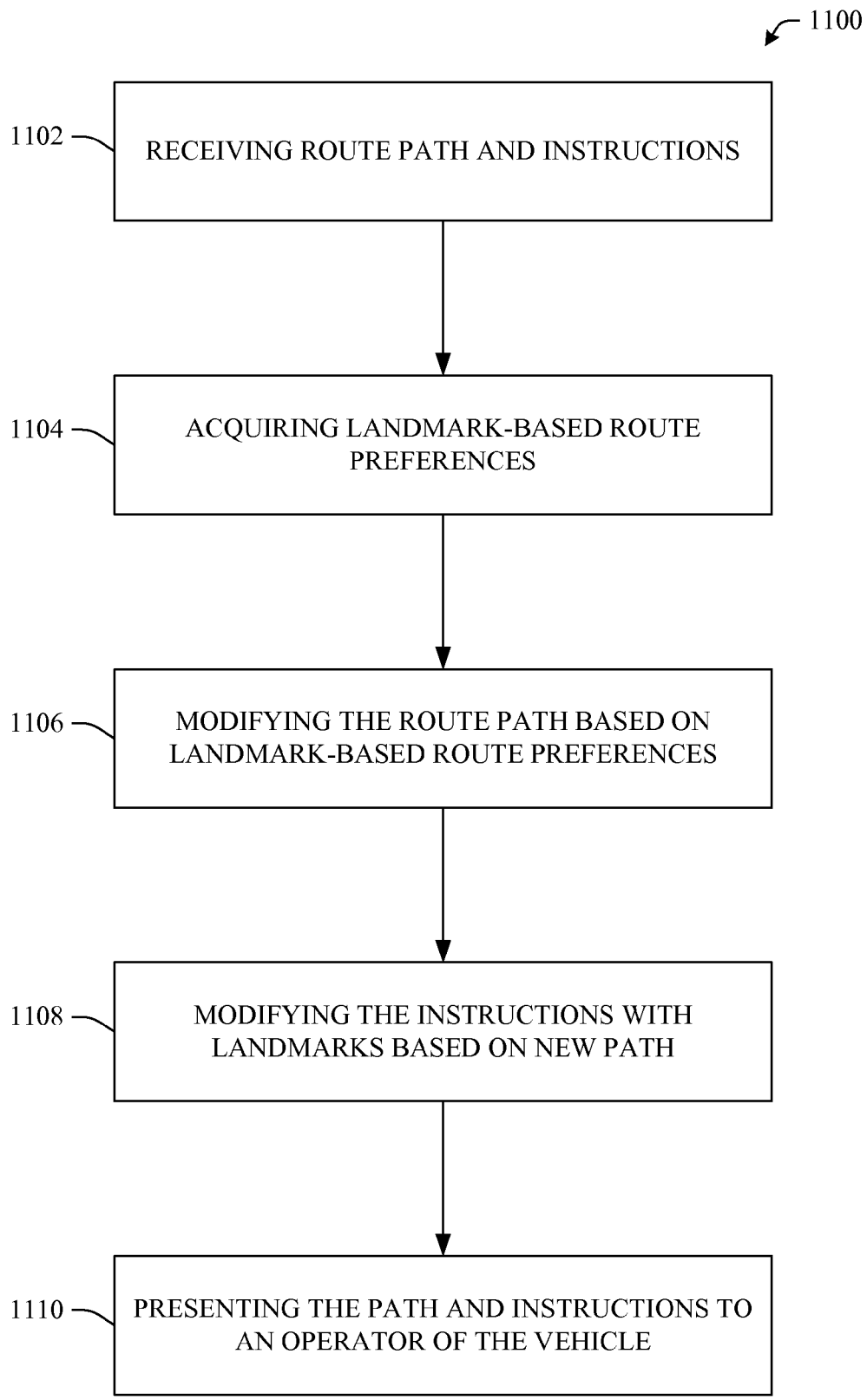
FIG. 11 illustrates a representative methodology for integrating a route request with a landmark in accordance with an aspect of the subject specification.

FIG. 11 is an example of a route modification methodology 1100 based on landmark-based preferences. One embodiment involves augmenting a route with landmark-based U-turn instructions if a turn is missed. For example, "You've gone too far if you see a company S gas station. Make a U-turn and go back to Main St and turn right." Another embodiment allows a user specifying that they want to avoid steep hills. For example, an analysis component can recalculate the route, avoiding roads with elevation-change-based landmarks. Yet another embodiment involves a user who likes coffee and prefers to drive past drive-thru coffee shops whenever possible. Another example involves scoring scenic landmarks (e.g., lakes, parks, views, etc) and altering a route based on a preference for scenic landmarks. Another example of methodology 1100 is to alter the route path to drive past gas stations when the Sensors 206 indicate that fuel is below ¼ tank. The methodology 1100 begins with event 1102 of receiving a route path and instructions. Action 1104 involves acquiring landmark-based route preferences. One embodiment involves keeping these preference in storage. A different embodiment has a user specify these preferences before the route path and instructions are calculated, allowing methodology 1100 to be included in the original route generation process.

Action 1106 is modifying the route path based on a landmark-based route preferences. One embodiment involves recalculating the entire route; another embodiment involves replacing sections of the route with a modified path with at least one landmark that was received.

Action 1108 involves modifying the instructions based on the new path. For the example with landmark-based U-Turn instructions, this involves the addition of the conditional instructions to be followed when a turn is missed. For the example where the user likes coffee, this involves highlighting the coffee shop and informing the user of the drive-thru.

Event 1110 is presenting the path to an operator of the vehicle. Presentment can take place according to a number of different embodiments. According to one embodiment, presentment is printing a physical copy. According to another embodiment, presentment is saving a copy of the path on an auxiliary device.

Figure 12:
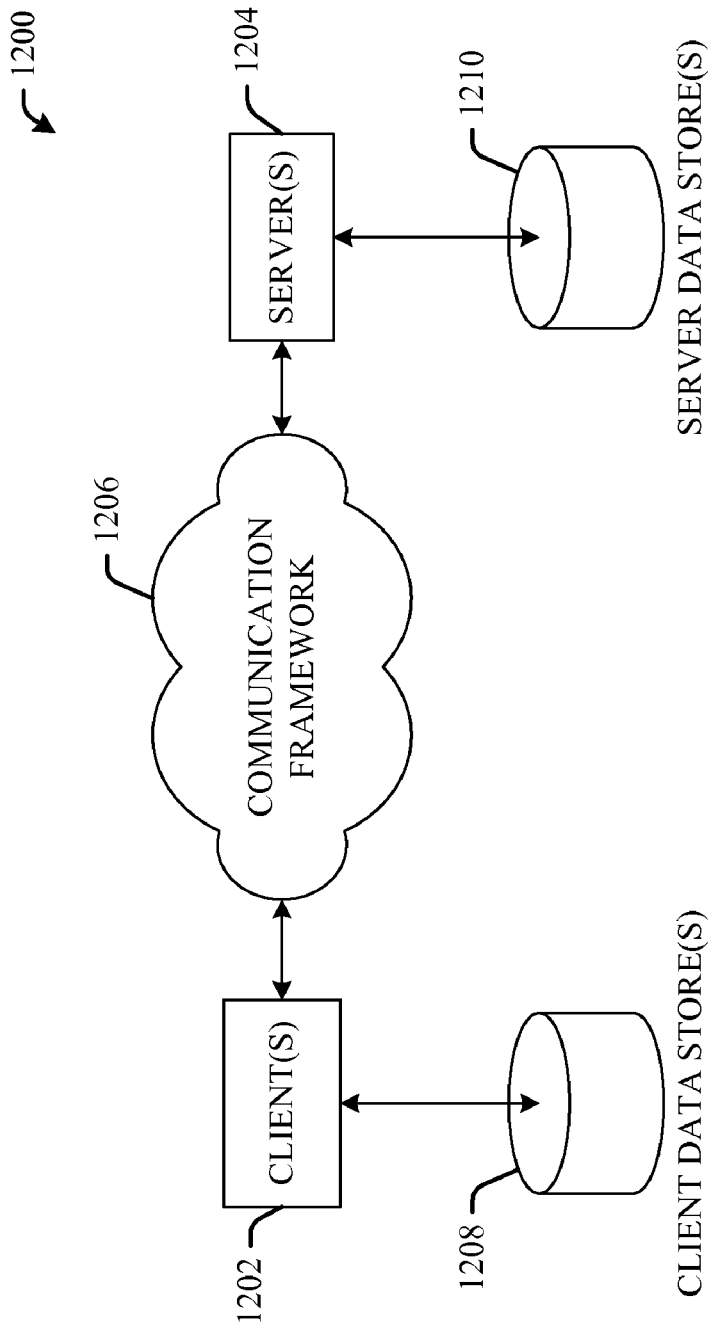
FIG. 12 illustrates an example of a schematic block diagram of a computing environment in accordance with the subject specification.

Referring now to FIG. 12, there is illustrated a schematic block diagram of a computing environment 1200 in accordance with the subject specification. The system 1200 includes one or more client(s) 1202. The client(s) 1202 can be hardware and/or software (e.g., threads, processes, computing devices). The client(s) 1202 can house cookie(s) and/or associated contextual information by employing the specification, for example.

The system 1200 also includes one or more server(s) 1204. The server(s) 1204 can also be hardware and/or software (e.g., threads, processes, computing devices). The servers 1204 can house threads to perform transformations by employing the specification, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

Figure 13:
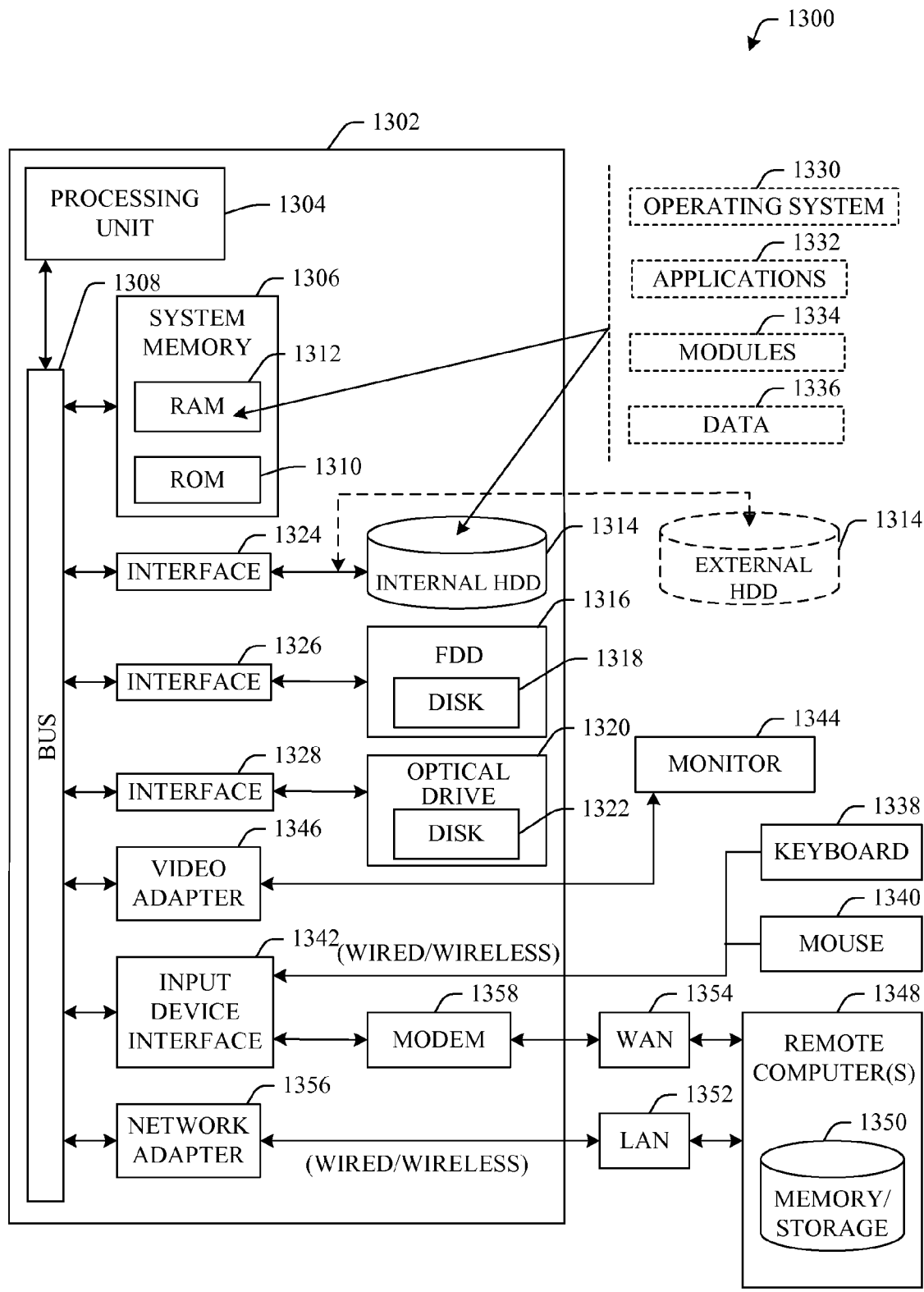
FIG. 13 illustrates an example of a block diagram of a computer operable to execute the disclosed architecture.

Referring now to FIG. 13, there is illustrated a block diagram of a computer operable to execute the disclosed architecture. In order to provide additional context for various aspects of the subject specification, FIG. 13 and the following discussion are intended to provide a brief, general description of a suitable computing environment 1300 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the example environment 1300 for implementing various aspects of the specification includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for providing to a user of a vehicle route guidance with landmark information, the system comprising:
   at least one sensor on the vehicle, the at least one sensor collecting information comprising at least one of user stress, user feedback, voice recognition, facial recognition, gesture recognition and language parsers;
   a generation component that:
       creates a route, and
       selects, based on a plurality of scores and information comprising at least one of the user stress, user feedback, voice recognition, facial recognition, gesture recognition and language parsers collected by the at least one sensor, a landmark to be included in the landmark information;
   a modification component that:
       integrates the landmark information comprising the landmark selected based on the plurality of scores and the information collected by the at least one sensor upon the route to obtain an integrated route; and
   a transmission component that emits the integrated route to an auxiliary location.

2. The system of claim 1, wherein:
   the plurality of scores comprise a score calculated for the landmark based on at least one of a static property of the landmark and a relationship of the landmark to the route, and
   the generation component selects the landmark based on the calculated score.

3. The system of claim 1, wherein the at least one sensor collects information relating to operation of the vehicle and comprises at least one of a tire pressure sensor, tire wear sensor, vibration sensor, noise sensor, air quality sensor, power meters, fuel sensors, energy levels sensor, and energy utilization sensor.

4. The system of claim 1, further comprising storage that holds a landmark database that is used in integration of the landmark information to the route.

5. The system of claim 1, further comprising an analysis component that performs an operation upon information related to the route.

6. The system of claim 1, further comprising a calculation component that performs at least one estimation in relation to an operator perception of the landmark, wherein the estimation is used in integration of the landmarks upon the route.

7. The system of claim 1, further comprising artificial intelligence that makes an inference or determination on what landmark information to integrate upon the route.

8. The system of claim 1, further comprising an input component that obtains information from the user that is used in creation of the route.

9. The system of claim 1, wherein the information collected by the at least one sensor is user stress.

10. The system of claim 3, wherein the information collected by the at least one sensor comprises information on an amount of fuel remaining in the vehicle and the generation component selects the landmark as a landmark comprising a station to re-fuel the vehicle.

11. The system of claim 6, wherein the at least one estimation in relation to the operator perception of the landmark comprises an estimation of a perceptual salience of the landmark based on at least one of a time of day and a season of the year.

12. The system of claim 11, wherein an analysis component selects the landmark based on the estimation of the perceptual salience of the landmark comprising lighting.

13. The system of claim 11, wherein an analysis component selects the landmark based on the estimation of the perceptual salience of the landmark comprising weather.

14. The system of claim 7, wherein the artificial intelligence determines a probability of usefulness of the landmark.

15. A method for providing route guidance with landmark information, the method comprising:
   operating at least one processor to:
       determine a route based on user input from a user;
       select landmarks based on a plurality of scores, wherein a number of the selected landmarks is selected based on a likelihood of the user being lost while using the route such that the number of the selected landmarks is higher when the likelihood of the user being lost is higher;
       integrate the selected landmarks into the route to obtain an integrated route, the integrated route comprising directions for following the route, at least one of the directions comprising a direction of travel relative to a selected landmark from the selected landmarks; and
       emit the integrated route to an auxiliary location.

16. The method of claim 15, wherein selecting the landmarks based on a plurality of scores comprises preferentially selecting a landmark to which the user of the integrated route is inferred to have prior exposure.

17. The method of claim 16, wherein selecting the landmarks based on a plurality of scores comprises preferentially selecting a landmark that is highly visible to a driver of a vehicle traversing the route.

18. The method of claim 17, wherein the auxiliary location comprises a display screen or a speaker.

19. The system of claim 1, wherein the at least one sensor collects information relating to environment around the vehicle and comprises at least one of a terrain sensor, noise sensor, air quality sensor, video perception sensors and audio perception sensors.

20. The system of claim 19, wherein information collected by the video perception sensors comprises at least lighting of the environment.

* * * * *